(12) United States Patent
Brown et al.

(10) Patent No.: US 8,511,075 B2
(45) Date of Patent: Aug. 20, 2013

(54) FLAME DEFLECTOR FOR EMISSIONS CONTROL SYSTEM

(75) Inventors: Cory Andrew Brown, Peoria, IL (US); Glenn Brian Cox, Peoria, IL (US); Yung T. Bui, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 983 days.

(21) Appl. No.: 12/233,660

(22) Filed: Sep. 19, 2008

(65) Prior Publication Data

US 2010/0071355 A1 Mar. 25, 2010

(51) Int. Cl.
*F01N 3/10* (2006.01)
*F01N 3/02* (2006.01)
*F01N 3/00* (2006.01)

(52) U.S. Cl.
USPC ............. 60/303; 60/300; 60/301; 60/302; 60/324; 60/311

(58) Field of Classification Search
USPC ............. 60/273–324; 123/198 F; 422/168, 422/173–175; 239/533.12, 521; 431/8, 12, 431/9, 10, 129, 116, 353, 78
See application file for complete search history.

(56) References Cited

U.S. PATENT DOCUMENTS

| | | | |
|---|---|---|---|
| 1,977,113 A * | 10/1934 | Baresch | 126/214 D |
| 3,130,541 A | 4/1964 | Babbit | |
| 3,751,920 A | 8/1973 | Rosenlund | |
| 3,802,829 A * | 4/1974 | Morris | 431/353 |
| 3,859,034 A * | 1/1975 | Heyde et al. | 431/80 |
| 3,863,445 A | 2/1975 | Heath | |
| 4,615,173 A * | 10/1986 | Usui et al. | 60/286 |
| 4,800,719 A | 1/1989 | Campbell | |
| 5,571,484 A * | 11/1996 | Pettit et al. | 422/173 |
| 5,771,683 A * | 6/1998 | Webb | 60/274 |
| 5,826,428 A * | 10/1998 | Blaschke | 60/303 |
| 6,012,285 A | 1/2000 | Lutz et al. | |
| 6,324,838 B1 | 12/2001 | Stempien et al. | |
| 6,745,562 B2 | 6/2004 | Berriman et al. | |
| 6,971,235 B2 * | 12/2005 | Langenfeld et al. | 60/517 |
| 7,171,805 B2 | 2/2007 | Ruehle | |
| 7,481,048 B2 * | 1/2009 | Harmon et al. | 60/303 |
| 2005/0000209 A1 * | 1/2005 | Takahashi et al. | 60/286 |
| 2008/0078172 A1 | 4/2008 | Miller et al. | |

FOREIGN PATENT DOCUMENTS

JP 6294718 A 10/1994

OTHER PUBLICATIONS

Haynes International Standard Products, Hastelloy X Alloy.*

* cited by examiner

*Primary Examiner* — Kenneth Bomberg
*Assistant Examiner* — Anthony Ayala Delgado
(74) *Attorney, Agent, or Firm* — Finnegan, Henderson, Farabow, Garrett & Dunner LLP

(57) ABSTRACT

A combustion device for an exhaust treatment system is disclosed. The combustion device may have a fuel injector configured to inject fuel toward an exhaust flow. The combustion device may also have an ignition source configured to ignite the injected fuel. The combustion device may further have a deflector configured to redirect at least a portion of the ignited fuel towards a center of the exhaust flow.

12 Claims, 6 Drawing Sheets

FLAME DEFLECTOR FOR EMISSIONS CONTROL SYSTEM

TECHNICAL FIELD

The present disclosure relates generally to a flame deflector and, more particularly, to a flame deflector for an emissions control system.

BACKGROUND

Conventional diesel powered systems for engines, factories, and power plants produce emissions that contain a variety of pollutants. These pollutants may include, for example, particulate matter (e.g., soot), nitrogen oxides (NOx) such as NO and NO2, hydrocarbons, and sulfur compounds. Due to heightened environmental concerns, diesel powered engine exhaust emission standards have become increasingly stringent. The amount of pollutants in the exhaust flow may be regulated depending on the type, size, and/or class of engine.

One method implemented by engine manufacturers to comply with the regulation of particulate matter exhausted to the environment has been to remove the particulate matter from the exhaust flow of an engine with a device called a particulate trap or diesel particulate filter (DPF). A DPF is a filter designed to trap particulate matter and typically consists of a wire mesh or ceramic honeycomb medium. The use of the DPF for extended periods of time, however, may cause the particulate matter to build up in the medium, thereby reducing the functionality of the DPF and subsequent engine performance.

The collected particulate matter may be removed from the DPF through a process called regeneration. The regeneration process may involve elevating the temperature of the exhaust flow to a high temperature. The heated exhaust may then pass through the DPF and oxidize the particulate matter trapped within the DPF (i.e., active regeneration) and/or increase the temperature of a catalyst located within the DPF for passive regeneration.

One device that may be used to heat an exhaust flow is described in U.S. Patent Publication 2008/0078172 by Miller et al (the '172 publication). The '172 publication discloses an aftertreatment burner. The aftertreatment burner may have a mounting member, and a canister connected to the mounting member to form a combustion chamber. The aftertreatment burner may also have a fuel injector disposed within the mounting member to selectively inject fuel into combustion chamber, and an air supply line configured to supply air to the combustion chamber. The aftertreatment burner may further have an igniter disposed within the mounting member to ignite the fuel/air mixture, and a thermal couple configured to detect the ignition.

Although burners may be effective at heating the exhaust and removing particulate matter, the flame from the burner may also interact with and damage the exhaust conduit. A damaged exhaust conduit may result in decreased performance and untreated exhaust emissions entering the atmosphere.

The disclosed deflector is directed to overcoming one or more of the problems set forth above.

SUMMARY OF THE DISCLOSURE

In one aspect, the present disclosure is directed to a combustion device for an exhaust treatment system. The combustion device may include a fuel injector configured to inject fuel toward an exhaust flow. The combustion device may also include an ignition source configured to ignite the injected fuel. The combustion device may further include a deflector configured to redirect at least a portion of the ignited fuel towards a center of the exhaust flow.

In another aspect, the present disclosure is directed to a method of heating an exhaust flow. The method may include injecting fuel towards an exhaust flow. The method may also include igniting the injected fuel. The method may further include redirecting the ignited fuel towards a center of the exhaust flow.

DETAILED DESCRIPTION

Figure 1:
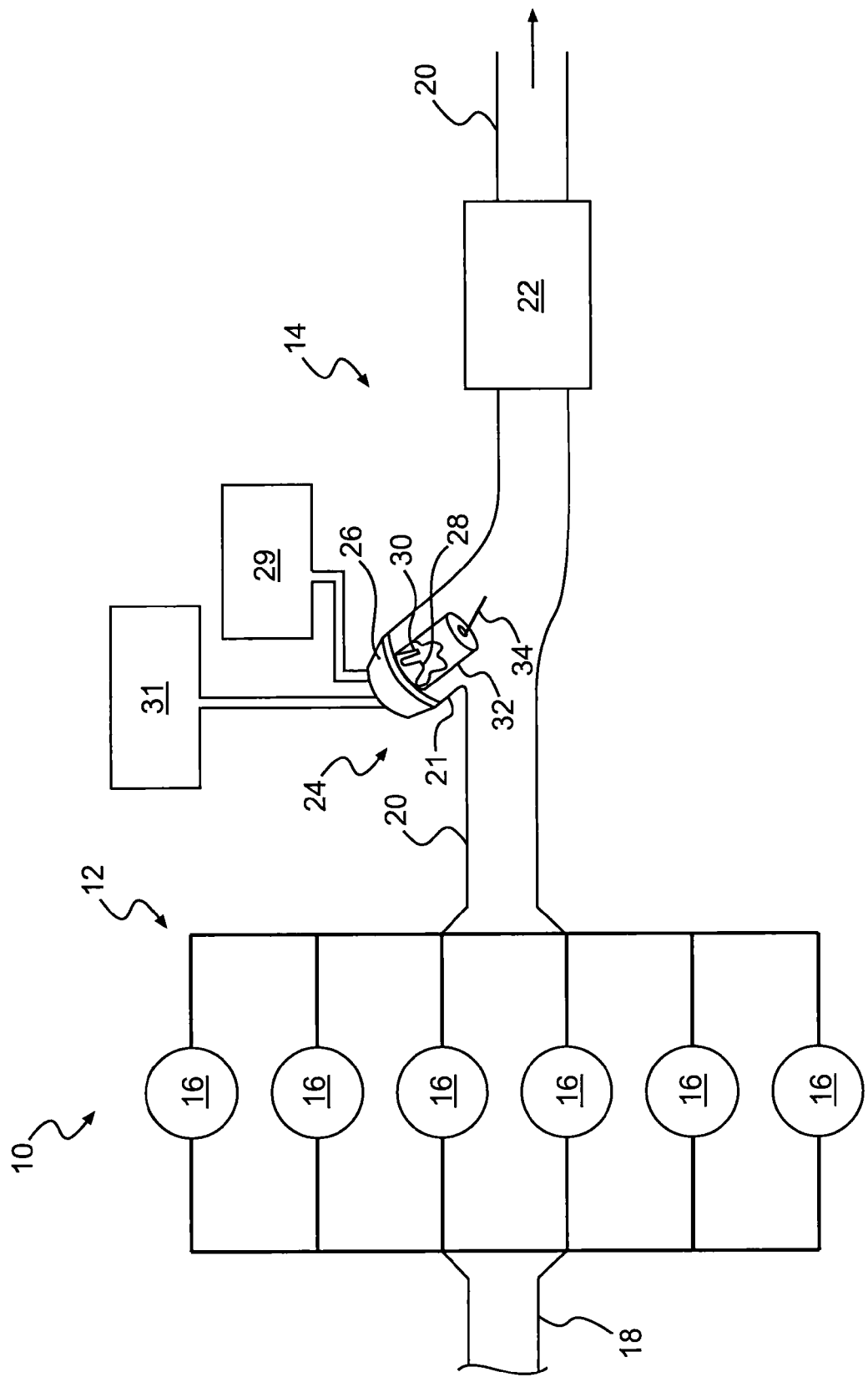
FIG. 1 is a diagrammatic illustration of an exemplary disclosed exhaust system including an emissions control system.

FIG. 1 illustrates a diagrammatic representation of an exhaust system 10 (or other fluid system), which may be coupled to a power source 12. Power source 12 may embody a combustion engine, such as, for example, a diesel engine, a gasoline engine, a gaseous fuel-powered engine (e.g., a natural gas engine), or any other type of combustion engine known to one skilled in the art. Power source 12 may have a plurality of combustion chambers 16 that convert potential chemical energy (usually in the form of a combustible gas) into useful mechanical work. It is also considered that power source 12 may embody a furnace or a similar device. Power source 12 may receive air via an intake 18 and may output a flow of exhaust via an exhaust conduit 20. It is contemplated that exhaust system 10 may include an emissions control system 14.

Emissions control system 14 may reduce emissions of harmful gases and particulate matter emitted from power source 12 after a combustion process. Emissions control system 14 may include a filtering device 22 and a combustion device 24. It is contemplated that emissions control system 14 may include other components, such as, for example a diesel oxidation catalyst, a selective catalytic reduction device, a NOx trap, and other emissions control devices known in the art.

Filtering device 22 may be a wall-flow or flow-through device configured to filter particulate matter, chemicals, and other pollutants from the flow of exhaust before the exhaust flow is released into the atmosphere via exhaust conduit 20. Filtering device 22 may contain filtering elements (not shown), arranged in a honeycomb, mesh, or other suitable configuration. Filtering device 22 may embody, for example, a diesel particulate filter (DPF), a catalyzed diesel particulate filter (CDPF), a diesel oxidation catalyst followed by a DPF, or any other suitable filtering device known in the art.

Combustion device 24 may be configured to inject fuel and ignite the injected fuel in order to heat the exhaust flow. Combustion device 24 may be located in and/or coupled to exhaust conduit 20. In one embodiment, exhaust conduit 20 may include a bifurcation 21 to house combustion device 24. Combustion device 24 may embody, for example, a combustion type burner. Combustion device 24 may utilize any appropriate fuel, such as, for example, gasoline, diesel fuel, gaseous fuels (e.g., natural gas, butane, propane), or any other type of fuel known in the art. Combustion device 24 may include, among other things, a housing 26, an injector 28, an ignition source 30, a combustion canister 32, and a deflector 34. Combustion device 24 may receive air from an air source 29 (e.g., intake air) and receive fuel from a fuel source 31 (e.g., a fuel tank). It is contemplated that combustion device 24 may include additional or different components, such as, for example, additional injectors, a controller, sensors, and other components known in the art.

Housing 26 may receive and interconnect injector 28, ignition source 30, and combustion canister 32. Housing 26 may include passageways for fuel, air, coolant, and other appropriate fluids that may be used by combustion device 24.

Injector 28 may be disposed within housing 26 and configured to inject one or more amounts of pressurized fuel into combustion canister 32. Injector 28 may be any appropriate type of fluid injector. For example, injector 28 may be mechanically, hydraulically, or electrically actuated. Injector 28 may be configured to inject one or more injections at predetermined timings, fuel pressures, and fuel flow rates. The timing of fuel injection into combustion canister 32 may be synchronized with sensory input received from one or more sensory devices (not shown) such as a thermocouple, one or more pressure sensors, a timer, or other appropriate sensory devices.

Ignition source 30 may be configured to ignite the fuel injected by injector 28. Ignition source 30 may embody, for example, a spark plug, a heating element, or any other ignition source or source of heat known in the art. In some configurations, the exhaust gas passing through exhaust conduit 20 may be sufficiently hot to act as ignition source 30. Ignition source 30 may ignite injected fuel, creating a flame that may be jetted or otherwise advanced into the exhaust stream. The flame jet propagating from injector 28 may raise the temperature of the exhaust to a temperature that oxidizes the particulate matter trapped within filtering device 22 and/or to a temperature that supports efficient operation of a catalyst located within filtering device 22.

Figure 2:
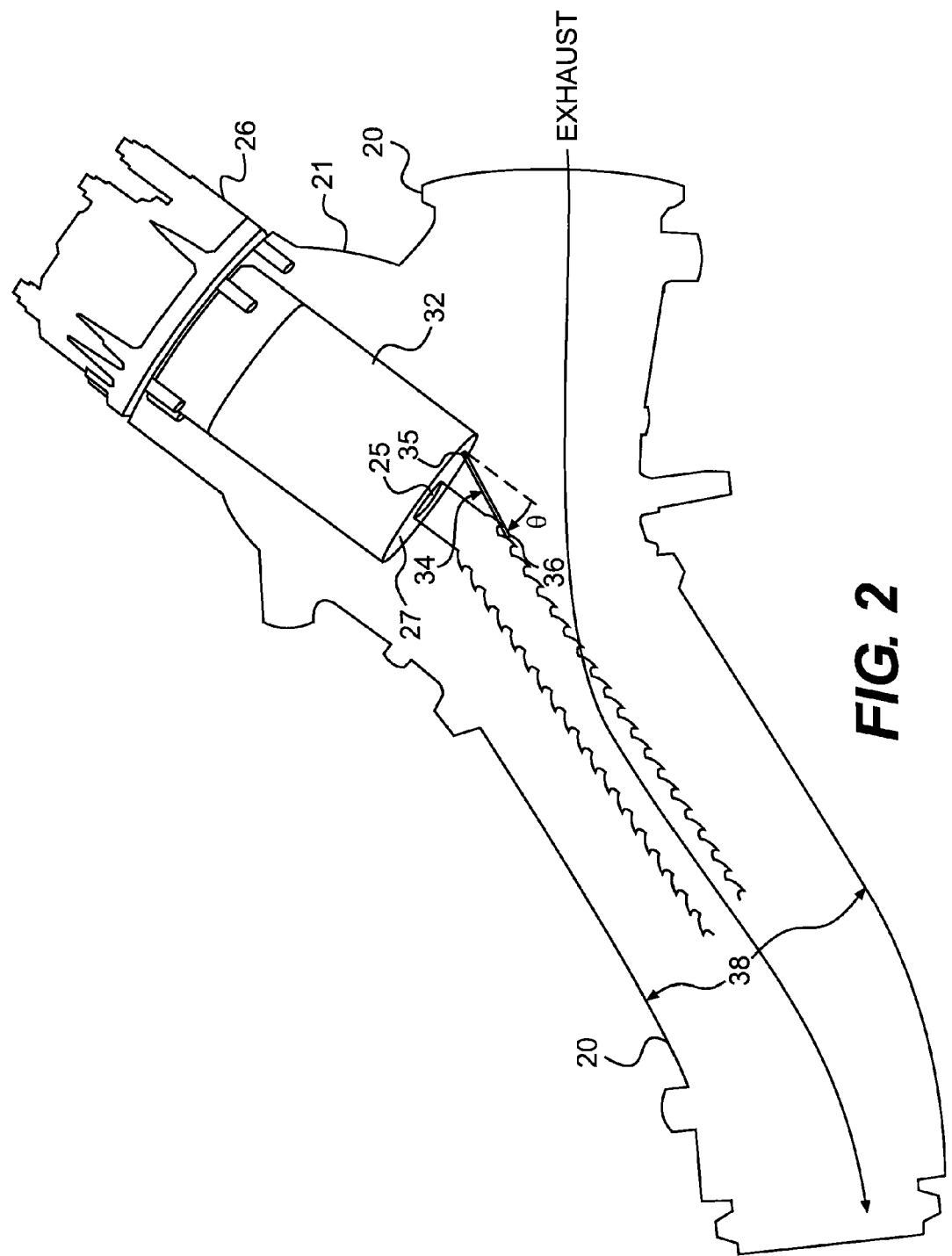
FIG. 2 is a diagrammatic illustration of an exemplary combustion device that may be used in the emissions control system of FIG. 1.

As shown in FIG. 2, combustion canister 32 may embody a tubular member configured to axially direct the ignited fuel/air mixture (i.e., the flame jet) into the exhaust flow in exhaust conduit 20. Combustion canister 32 may include a flame plate 27 with an opening 25 on a flame emitting end of combustion canister 32. Flame plate 27 may provide a restriction that improves the characteristics of the flame jet.

Deflector 34 may be a component configured to redirect or deflect the flame emitted from combustion device 24 away from an interior wall 38 of exhaust conduit 20 and towards a center of the exhaust flow in exhaust conduit 20, or in other words, towards the center of exhaust conduit 20. Deflector 34 may embody, for example, a plate-like member that attaches or is integrally formed with combustion canister 32 or an end cap 40 (see FIGS. 3 and 4). In one embodiment, a first end 35 of deflector 34 may attach to combustion canister 32 or end cap 40 while a second end 36 of deflector 34 extends from combustion canister 32. Deflector 34 may extend from combustion canister 32 on an acute angle θ such that deflector 34 occludes at least a portion of opening 25. Deflector 34 may have any appropriate profile as it extends from combustion canister 32 (e.g., substantially planar, curved, etc.). Deflector 34 may have a rectangular, circular, ellipsoidal, polygonal or any other cross-sectional shape known in the art (see FIGS. 3 and 4). It is contemplated that a thickness of deflector 34 may be sufficient to withstand the high temperatures associated with the deflection of the ignited fuel/air mixture.

Deflector 34 may be composed of a heat resistant material, such as, for example, a nickel-based alloy, a high-grade stainless steel (e.g., type 309), or any other appropriate heat resistant material. Specifically, it is contemplated that deflector 34 may be composed of a material with a higher heat resistance than exhaust conduit 20. In one embodiment, exhaust conduit 20 may be composed of a type 304 stainless steel. Using a deflector 34 with a higher heat resistance material than the material of exhaust conduit 20 (rather than using a high heat resistance material for exhaust conduit 20) may reduce cost and improve manufacturability of exhaust system 10. It is contemplated that deflector 34 may attach to combustion canister 32 via mechanical fasteners (e.g., bolts, screws, rivets, etc.), welding, or in any other manner known in the art.

Figure 3:
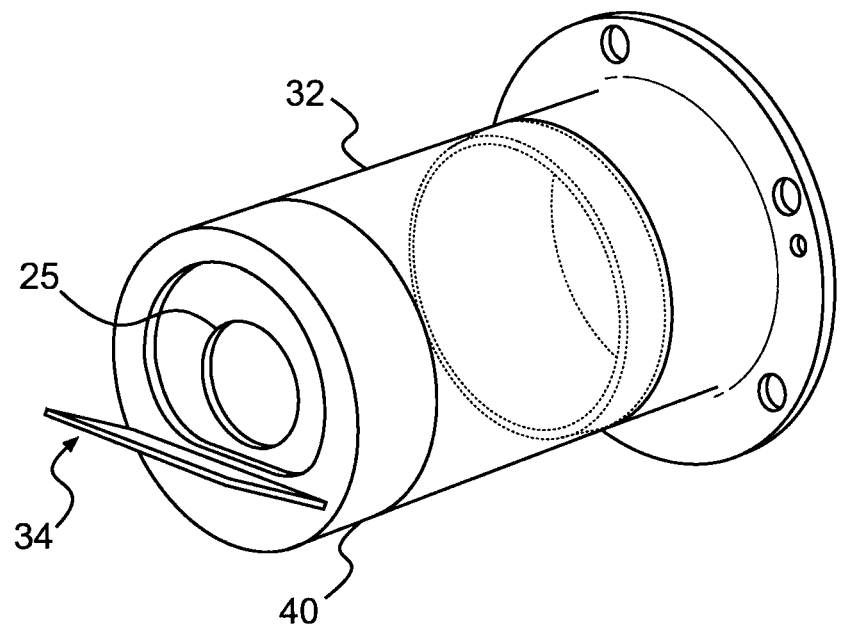
FIG. 3 is a diagrammatic illustration of an exemplary combustion canister that may be used in the combustion device of FIG. 2.
Figure 4:
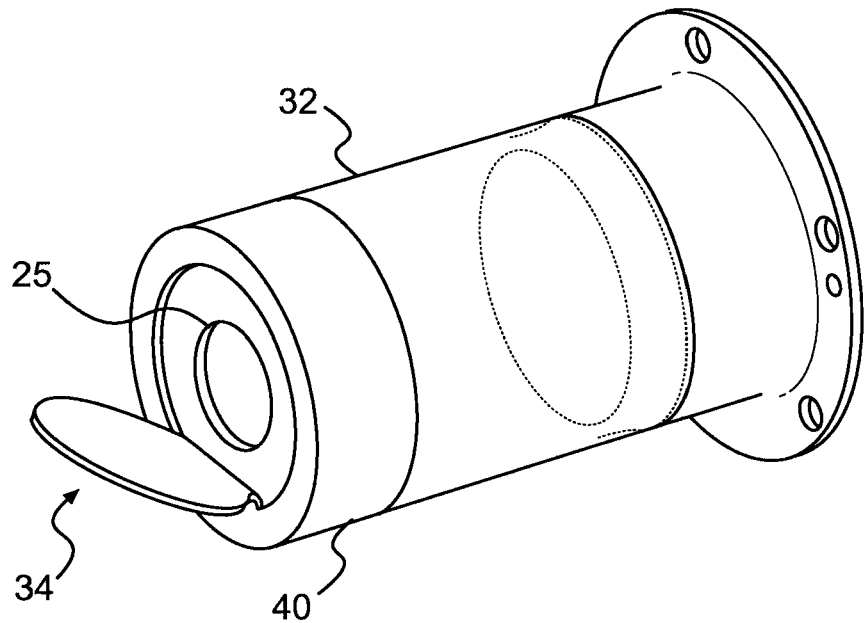
FIG. 4 is a diagrammatic illustration of another exemplary combustion canister that may be used in the combustion device of FIG. 2.

As shown in FIGS. 3 and 4, deflector 34 may also attach to combustion canister 32 via end cap 40. End cap 40 may be a substantially cylindrical component configured to mate with the flame emitting end of combustion canister 32. End cap 40 may attach to combustion canister 32 via mechanical fasteners, welding, or in any other appropriate manner. It is contemplated that the length of end cap 40 may be configured such that end cap 40 may be attached to combustion canister 32 at a location that experiences relatively low thermal stress during usage of combustion device 24 (e.g., towards a middle portion of combustion canister 32). End cap 40 may be composed of a nickel-based alloy, a high-grade stainless steel, or any other heat resistant material known in the art.

Figure 5:
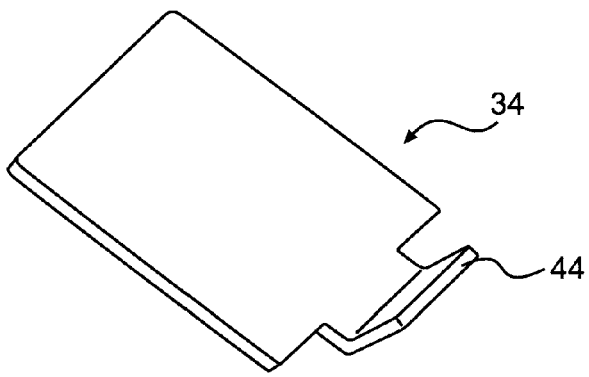
FIG. 5 is a diagrammatic illustration of a deflector that may be associated with the combustion canister of FIG. 3.
Figure 6:
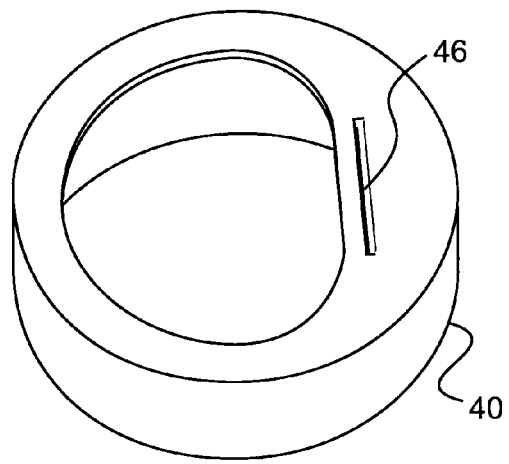
FIG. 6 is a diagrammatic illustration of an end cap that may be associated with the combustion canister of FIG. 3.
Figure 7:
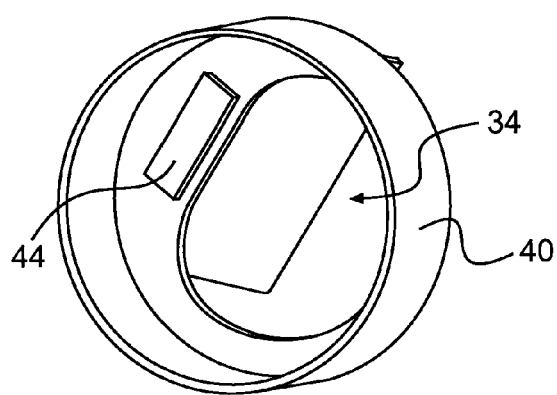
FIG. 7 is a diagrammatic illustration of an end cap and a deflector that may be associated with the combustion canister of FIG. 3.

As shown in FIG. 4, deflector 34 may be integral with end cap 40. For example, deflector 34 may be formed or stamped into end cap 40 and bent down to the angle θ. Alternatively, deflector 34 may attach to end cap 40 using mechanical fasters, welding, or any other method known in the art. For example, as shown in FIGS. 5 and 6, deflector 34 may include a tab 44 configured to mate with a slot 46 in end cap 40. A lower portion of tab 44 may be angled to help secure tab 44 into slot 46. Once tab 44 is mated within slot 46 (see FIG. 7), tab 44 may be welded to end cap 40.

Figure 8:
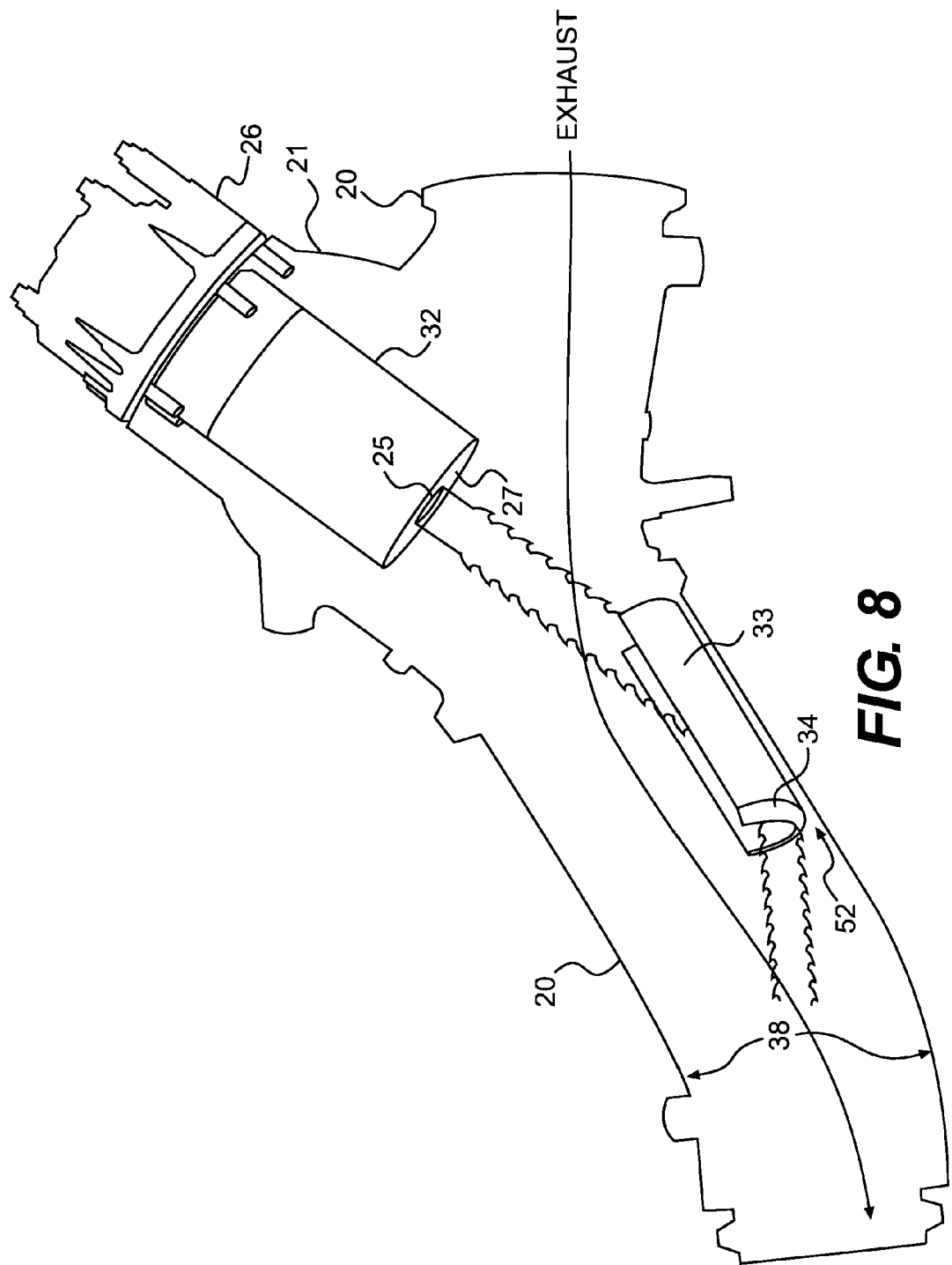
FIG. 8 is a diagrammatic illustration of another exemplary combustion device that may be used in the emissions control system of FIG. 1.
Figure 9:
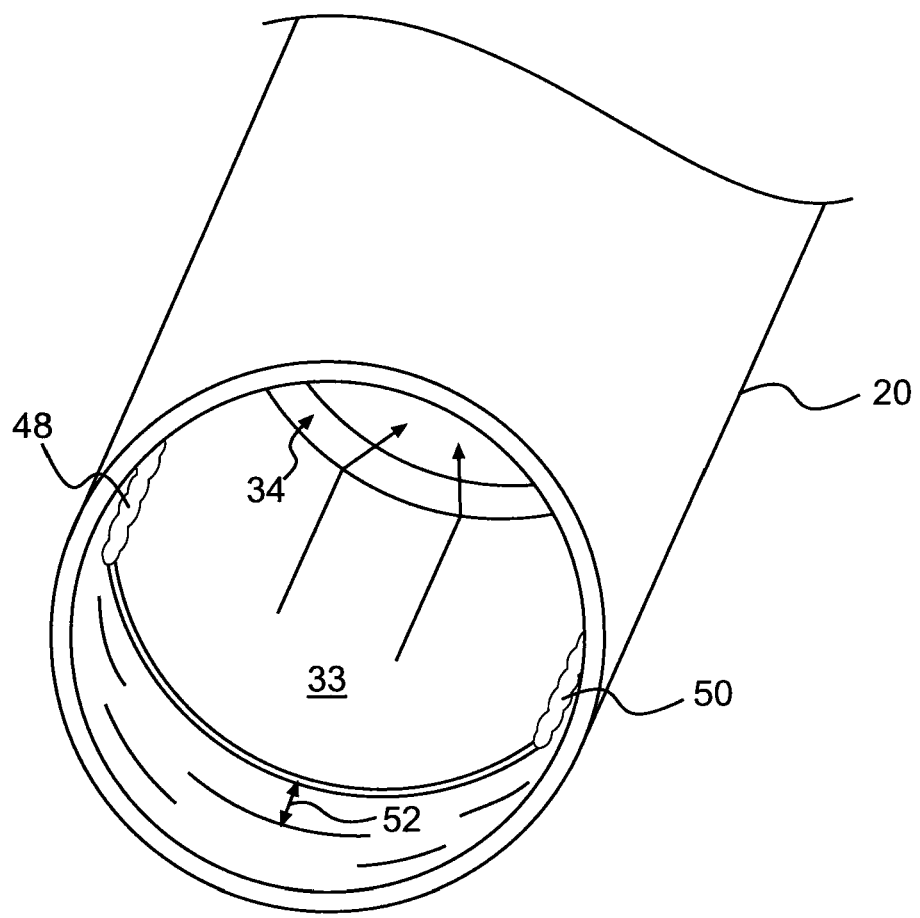
FIG. 9 is a diagrammatic illustration of an exemplary shield that may be used in the emissions control system of FIG. 1.

Referring to FIG. 8, emissions control system 14 may also include a shield 33. Shield 33 may be a component configured to protect exhaust conduit 20 from the flames emitted from combustion device 24. Shield 33 may be composed of a heat resistant material, such as, for example, a nickel-based alloy, a high-grade stainless steel, or any other heat resistant material known in the art. Shield 33 may be a curved plate-like component that is connected to an interior portion of exhaust conduit 20. Shield 33 may be attached to exhaust conduit 20 using mechanical fasteners, welding, or in any other appropriate manner. As shown in FIG. 9, shield 33 may be welded to exhaust conduit 20 along a first outer edge 48 and a second outer edge 50. In an alternative embodiment, shield 33 may connect to exhaust conduit 20 using tabs which protrude from shield 33 and interlock with slots in exhaust conduit 20. Using tabs and other types of mechanical fasteners may allow for thermal expansion and contraction of shield 33 relative to exhaust conduit 20.

It is contemplated that a radius of curvature of shield 33 may be less than a radius of curvature of exhaust conduit 20, thus creating a gap 52 between shield 33 and exhaust conduit 20. It is also contemplated that gap 52 may be formed by using mechanical fasteners to suspend shield 33 above exhaust conduit 20. Gap 52 may allow for increased interaction between shield 33 and the flow of exhaust (exhaust may flow across the bottom and the top of shield 33), thus improving the convective heat transfer from shield 33 and preventing overheating of shield 33.

Shield 33 may also include a deflector 34 on a downstream end of shield 33. Deflector 34 of shield 33 may be angled or curved such that the ignited fuel emitted from opening 25 may be directed towards a center of the exhaust stream. Deflector 34 of shield 33 may be attached to or formed integrally in shield 33.

INDUSTRIAL APPLICABILITY

The disclosed deflector may be applicable to any exhaust system that utilizes a combustion device for regeneration of a filtering device. The disclosed deflector may help ensure that the exhaust passageways associated with the exhaust system are not overheated and damaged during regeneration. Operation of the disclosed emissions control system will now be described.

Referring back to FIG. 1, air and fuel may be drawn into combustion chambers 16 of power source 12 for combustion. Specifically, fuel and air may be combusted to produce a mechanical work output and a flow of exhaust gases. The exhaust flow may contain a complex mixture of air pollutants composed of gases and particulate matter. As the exhaust flow is directed from combustion chambers 16 through exhaust conduit 20 to filtering device 22, particulate matter may collect within filtering device 22. Over time, the buildup may be significant enough to restrict, or even block the flow of exhaust through filtering device 22.

To prevent undesired buildup of particulate matter within filtering device 22, filtering device 22 may be regenerated. Regeneration may be periodic or based on a triggering condition, such as, for example, an elapsed time of engine operation, a pressure differential measured across filtering device 22, a temperature of the exhaust flowing from power source 12, or any other condition known in the art.

To initiate regeneration, injector 28 may inject fuel into combustion canister 32. As the fuel is injected into combustion canister 32, ignition source 30 may ignite the fuel. The ignited fuel may exit combustion canister 32 at opening 25 and enter the exhaust stream. As shown in FIG. 2, as the ignited fuel enters the exhaust stream, the ignited fuel may be redirected by deflector 34 of combustion device 24 towards a center of the exhaust flow. Alternatively, as shown in FIG. 8, the ignited fuel may substantially pass through the flow of exhaust and then be redirected towards the center of the exhaust flow by deflector 34 of shield 33.

As the ignited fuel interacts with the exhaust, it may raise the temperature of the exhaust. The heated exhaust may then pass through filtering device 22, regenerating filtering device 22.

Several advantages of the disclosed deflector may be realized. In particular, the disclosed deflector may help ensure that the exhaust passageways associated with the exhaust system are not overheated and damaged during regeneration events. The disclosed deflector may also allow for a combustion device to be used in a variety of different orientations within the exhaust conduit while still generally maintaining the emitted flame in the exhaust stream.

It will be apparent to those skilled in the art that various modifications and variations can be made to the disclosed deflector and emissions control system. Other embodiments will be apparent to those skilled in the art from consideration of the specification and practice of the disclosed deflector and emissions control system. It is intended that the specification and examples be considered as exemplary only, with a true scope being indicated by the following claims.

What is claimed is:

1. A method of heating an exhaust flow, comprising:
injecting fuel towards an exhaust flow in an exhaust conduit having a central longitudinal axis;
igniting the injected fuel in a canister to create a flame jet emitted out of an opening in an end of the canister; and
redirecting the flame jet at an acute angle with respect to a longitudinal axis of the canister towards the central longitudinal axis of the exhaust conduit with an end cap including a deflector plate located on the end of the canister, wherein the flame emitted from the canister passes through the opening in the canister and an opening in the end cap and is redirected with the deflector plate from the longitudinal axis of the canister toward the central longitudinal axis of the exhaust conduit, and wherein the opening in the end cap is larger than the opening of the canister.

2. The method of claim 1, wherein redirecting occurs as the ignited fuel enters the exhaust flow.

3. An exhaust system, comprising:
an exhaust conduit configured to receive an exhaust flow, the exhaust conduit having a central longitudinal axis;
a combustion device coupled to the exhaust conduit, wherein the combustion device includes:
a fuel injector configured to inject fuel;
a canister configured to receive the injected fuel, the canister having an opening on an end of the canister and a longitudinal axis; and
an end cap configured to mate with the canister, the end cap including a deflector and an opening, wherein the end cap is arranged such that a flame emitted from the canister passes through the opening in the canister and the opening in the end cap, wherein the opening in the end cap is larger than the opening of the canister,
wherein the canister is oriented relative to the exhaust conduit such that the longitudinal axis of the canister is at an angle with respect to the central longitudinal axis of the exhaust conduit, wherein the deflector extends away from the end of the canister at an acute angle with respect to the longitudinal axis of the canister such that the deflector deflects the flame toward the central longitudinal axis of the exhaust conduit.

4. The exhaust system of claim 3, wherein the deflector is an integral part of the end cap.

5. The exhaust system of claim 3, wherein the end cap includes a slot and the deflector includes a tab, the tab being configured to mate with the slot.

6. The exhaust system of claim 3, wherein the deflector occludes at least a portion of the opening.

7. The exhaust system of claim 3, wherein the deflector is composed of a first material and the exhaust conduit is composed of a second material, the first material having a higher resistance to heat than the second material.

8. The exhaust system of claim 7, wherein the first material is at least one of a nickel-based alloy or a temperature resistant stainless steel.

9. The exhaust system of claim 3, wherein the end cap is welded onto the canister.

10. The exhaust system of claim 3, wherein the end cap is mechanically fastened to the canister.

11. The exhaust system of claim 3, wherein the deflector is approximately the same size as the opening in the end cap.

12. The exhaust system of claim 3, further including an ignition source configured to ignite the injected fuel, wherein the ignition source includes at least one of a spark plug, a heating element, and the exhaust flow.

* * * * *